United States Patent [19]
Nishino et al.

[11] Patent Number: 4,778,708
[45] Date of Patent: Oct. 18, 1988

[54] ORIENTED POLYESTER FILM

[75] Inventors: Yasuhiro Nishino, Fukui; Katsuaki Kuze; Yujiro Matsuyama, both of Shiga; Osamu Makimura, Gifu, all of Japan

[73] Assignees: Toyobo Co., Ltd., Osaka; Nippon Magphane Kabushiki Kaisha, Tokyo, both of Japan

[21] Appl. No.: 6,195

[22] Filed: Jan. 23, 1987

[30] Foreign Application Priority Data

Jan. 24, 1986 [JP] Japan .................................. 61-14479

[51] Int. Cl.$^4$ ........................ B32B 5/16; B32B 27/36; D06N 7/04
[52] U.S. Cl. .................... 428/143; 428/323; 428/333; 428/409; 428/480; 428/900; 523/220; 528/286
[58] Field of Search ............... 428/480, 220, 323, 900, 428/409, 333, 143; 523/220; 528/286, 275; 264/211

[56] References Cited

U.S. PATENT DOCUMENTS 3,980,611 9/1976 Anderson et al. .................. 523/220
4,067,855 1/1978 Miwa et al. ...................... 528/286 X
4,725,472 2/1988 Okabe et al. ..................... 428/143 X Primary Examiner—Thomas J. Herbert
Attorney, Agent, or Firm—Wegner & Bretschneider

[57] ABSTRACT

An oriented polyester film having at least one surface being roughened by containing inactive particles and three-dimensional surface roughness exponents of the said roughened surface are within ranges simultaneously satisfying the following relationships (I) to (III), while the number of coarse projections is in excess of the fourth grade:

$$0.014 \leq S\Delta a \leq 0.025 \quad (I)$$

$$5.2 \leq S\lambda a \leq 13.0 \quad (II)$$

$$0.012 \leq SRa \leq 0.050 \quad (III)$$

where $S\Delta a$ represents three-dimensional average gradient, $S\lambda a$ represents the spatial average wavelength ($\mu$m) of three-dimensional surface roughness and $SRa$ represents three-dimensional central plane average roughness ($\mu$m).

11 Claims, 1 Drawing Sheet

ORIENTED POLYESTER FILM

BACKGROUND OF THE INVENTION

1. Field of the Invention

The present invention relates to an oriented polyester film. More particularly, it relates to an oriented polyester film applicable to a base film for a magnetic recording medium, which is excellent in slipperiness and endurable travelling performance.

1. Description of the Prior Art

In general, polyester films such as those of polyethylene terephthalate are excellent in physical and chemical characteristics and used as films for magnetic tapes, floppy disks, photographic films, films for condensers, packaging films, Roentgen films and microfilms in addition to films for fiber and molded substances. Slipperiness, abrasion resistance and the like of such polyester films exert serious influence on workability in film production steps and the quality of the produced films. Particularly when a polyester film is coated on its surface with a magnetic layer to be applied to a magnetic tape, friction and abrasion are remarkably caused between the film surface and a coating roller for applying the magnetic layer, resulting in wrinkles and scratches on the film surface. After the polyester film coated with the magnetic layer is slit to be worked into an audio tape, video tape or a computer tape, friction and abrasion are remarkably caused between the tape and a guide portion, a reproduction head or the like when the tape is taken up from a reel or cassette or wound around the same, leading to scratches and distortion of the tape. Further, white pulverulent material is deposited by scraping of the polyester film surface, to cause lack of magnetic recording signals, i.e., drop-out. Coarse projections caused by agglomeration of added particles imperfectly dispersed in the polyester film and large size of the particles also lead to a disadvantage such as the drop-out.

In order to improve slipperiness and endurable travelling performance of such a film, the film surface is generally irregularized to decrease the contact area between the film and a guide roll or the like. Such surface irregularity is generally formed by a method of depositing insoluble particles from the catalyst residue in a polymer employed as the material for the film as disclosed in U.S. Pat. No. 4,067,855 or a method of adding inactive inorganic or organic particles as disclosed in U.S. Pat. No. 3,980,611, for example. In general, slipperiness of the film is improved as the particles in the polymeric material are increased in size, whereas such increased particle size itself causes the disadvantage such as drop-out in precision use such as application to a magnetic tape and significant deterioration of electromagnetic transformation characteristics. Thus, the irregularity of the film surface must be precisely adjusted in configuration, density, height and the like.

The size distribution of the particles has been generally comprehended only in view of the average particle size while the particles are not controlled in size distribution and configuration, whereby it has been difficult to obtain a film surface configuration in design.

SUMMARY OF THE INVENTION

An object of the present invention is to overcome the aforementioned disadvantages of the conventional polyester film particularly applied to the base film for a magnetic tape and provide an oriented polyester film which is improved in dispersibility of externally added particles in the polyester film and excellent in slipperiness and endurable travelling performance while having a small number of coarse projections.

Provided according to the present invention is an oriented polyester film having at least one roughened surface containing inactive particles. Three-dimensional surface roughness indices of the said roughened surface are within ranges simultaneously satisfying the following relationships (I) to (III), while the number of coarse projections as defined in the following description is in excess of the fourth grade:

$$0.014 \leq S\Delta a \leq 0.025 \tag{I}$$

$$5.2 \leq S\lambda a \leq 13.0 \tag{II}$$

$$0.012 \leq SRa \leq 0.050 \tag{III}$$

where $S\Delta a$ represents three-dimensional average gradient, $S\lambda a$ represents spatial average wavelength ($\mu$m) of three-dimensional surface roughness and $SRa$ represents three-dimensional central plane average roughness ($\mu$m).

DETAILED DESCRIPTION OF THE INVENTION

Figure 1:
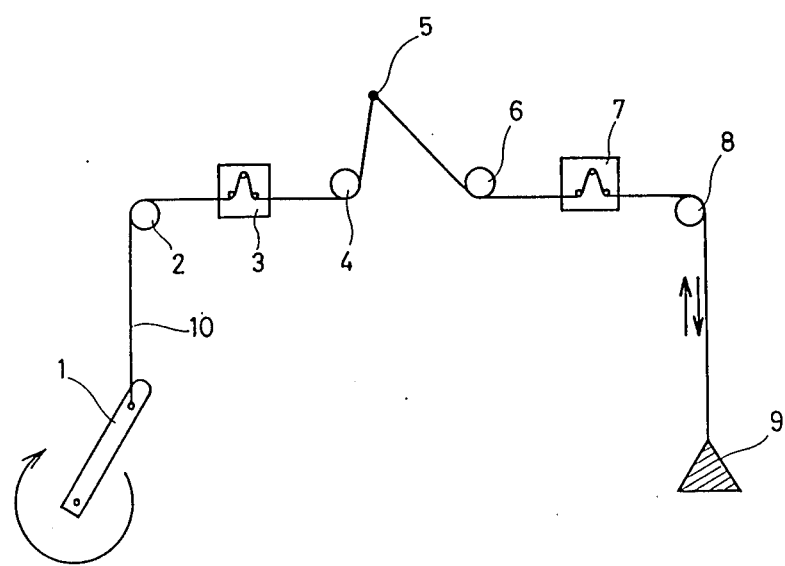
FIG. 1 is a typical diagram showing a tape tester for measuring cyclic travelling performance of a film roughened surface.

Polyester employed in the present invention is crystalline polyester with polyethylene terephthalate, polyalkylene naphthalate or the like not particularly restricted but most appropriately prepared by polyethylene terephthalate, which particularly consists of not less than 80 mol % of ethylene terephthalate as the repeating unit. Other copolymer component can be arbitrarily selected from dicarboxylic acid components such as isophthalic acid, p-β-oxyethoxy benzonic acid, 2,6-naphthalene dicarboxylic acid, 4,4'-dicarboxyl diphenel, 4,4'-dicarboxyl benzophenone, bis(4-carboxylphenyl)ethane, adipic acid, sebacic acid, 5-sodium sulfoisophthalic acid and cyclohexane-1,4-dicarboxylic acid, glycol components such as propylene glycol, butanediol, neopentylglycol, diethylene glycol, cyclohexane dimethanol, ethylene oxide additive of bisphenol A, polyethylene glycol, polypropylene glycol and polytetramethylene glycol and hydroxy carboxylic acid component such as p-oxybenzoic acid. A compound containing a small amount of amid linkage, urethane linkage, ether linkage or carbonate linkage may be contained as a copolymer component.

The said polyester can be prepared by an arbitrary method such as the so-called direct polymerization method of directly reacting aromatic dicarboxylic acid with glycol or the so-called ester interchange method of making transesterification of dimethylester of aromatic dicarboxylic acid and glycol. The film may be formed either as an uniaxial film or a biaxial film, while the biaxial film is particularly preferable.

According to the present invention, three-dimensional average gradient ($S\Delta a$) forming one of the three-dimensional surface roughness exponents must be within a range of 0.014 to 0.025, preferably of 0.015 to 0.025 and more preferably of 0.016 to 0.025. If the three-dimensional average gradient $S\lambda a$ is less than 0.014, slipperiness and endurable travelling performance of the tape cannot be sufficiently improved. Further, it is extremely difficult in our view to form abrupt film surface projections with $S\Delta a$ exceeding 0.025. According to the present invention, therefore, the uppermost limit of $S\Delta a$ has no critical meaning, but only the lowermost limit has critical meaning.

The spatial average wavelength $(S\lambda a)$, which forms another three-dimensional surface roughness exponent, must be within a range of 5.2 to 13.0, preferably of 5.2 to 11.0, and more preferably of 5.2 to 9.0. If the spatial average wavelength $S\lambda a$ is in excess of 13.0, slipperiness and endurable travelling performance cannot be sufficiently improved. Further, it is extremely difficult in our view to form film surface projections whose spatial average wavelength is less than 5.2. According to the present invention, therefore, the lowermost limit of the spatial average wavelength has no critical meaning, but only the uppermost limit has critical meaning.

Three-dimensional central plane average roughness (SRa) must be within a range of 0.012 to 0.050, preferably of 0.015 to 0.035. If the three-dimensional central plane average roughness SRa is less than 0.012, slipperiness and endurable travelling performance cannot be sufficiently improved. Further, if the three-dimensional central plane average roughness SRa is in excess of 0.050, the coarse projections are increased in number.

The polymer for a polyester film according to the present invention can be prepared through any arbitrary method, while the same is preferably obtained through the following procedure:

Particle size distribution of inactive particles employed in the present invention preferably simultaneously satisfies the following relationships:

$$0.2 \leq D_{50}/D_5 \leq 0.6 \quad (VII)$$

$$150 \leq D_{50} \times C \leq 10000 \quad (VIII)$$

where $D_{50}$ represents particle size ($\mu$m) at 50% integration, $D_5$ represents particle size ($\mu$m) at 5% integration and C represents the content (ppm) of particles.

It is obvious that the particle size distribution width is decreased as the particle size distribution ratio $(D_{50}/D_5)$ is increased. The particle size distribution ratio $(D_{50}/D_5)$ must be within a range of 0.2 to 0.6, preferably of 0.23 to 0.6, and more preferably of 0.26 to 0.6. In our view, it is extremely difficult to obtain particle size distribution at a particle size distribution ratio $(D_{50}/D_5)$ exceeding 0.6 in a practical range. According to the present invention, therefore, the uppermost limit of the particle size distribution ratio $(D_{50}/D_5)$ has no critical meaning. Slipperiness and endurable travelling performance are made insufficient when $D_{50}$ is small in case of the particle size distribution ratio $(D_{50}/D_5)$ being less than 0.2, while coarse projections are increased in number to cause a disadvantage such as the drop-out when $D_5$ is large, to obstruct the effect of the present invention.

When the particle size distribution is at 5% integration, the particle size $(D_5)$ must be within a range of 1 to 6 $\mu$m, preferably of 1.2 to 5.5 $\mu$m, and more preferably of 1.4 to 5 $\mu$m. When $D_5$ is less than 1 $\mu$m, slipperiness and endurable travelling performance cannot be sufficiently improved. When $D_5$ is in excess of 6, the coarse projections are unfavorably increased in number to cause a disadvantage such as the drop-out. The content C (ppm) of the inactive particles must be determined in combination with the average particle size $D_{50}$ ($\mu$m) such that the product of C and $D_{50}$ is within a range of 150 to 10000, preferably of 250 to 8000, and more preferably of 500 to 6000, as obvious from the equation (VIII). When the said product is less than 150, slipperiness and endurable travelling performance cannot be sufficiently improved. When the said product is in excess of 10000 to the contrary, the coarse projections are increased in number.

The inactive inorganic or organic particles employed in the present invention are not particularly restricted so far as the same satisfy the aforementioned equations (VII) and (VIII), but preferably prepared by calcium carbonate, silica, barium sulfate or titanium oxide, and most preferably by calcium carbonate.

Components of such inactive particles are not restricted in preparation method etc. so far as the same satisfy the conditions defined above, with respect to both of natural and synthetic substances. For example, calcium carbonate may be prepared by heavy calcium carbonate, precipitated calcium carbonate or colloidal calcium carbonate. The inactive particles may be of a single kind or of two or more kinds, in order to improve the film winding characteristic.

While the crystal form of the particles is not particularly restricted, the volume shape factor thereof is preferably within a range of 0.08 to 7 $\pi/6$. The volume shape factor f is expressed as follows:

$$f = V/D^3$$

where V represents the particle volume ($\mu$m$^3$) and D represents the maximum particle size ($\mu$m) in the plane of projection.

The volume shape factor expresses the degree of massiveness of the particles, which are more massive or made spherical as the volume shape factor thereof approaches $\pi/6$.

The term "average particle size" in this specification is intended to mean the particle size of equivalent spherical particle size distribution as calculated according to the Stokes' formula at 50% integration.

The inactive particles may be added to the polyester film according to the present invention in any arbitrary stage of the steps of producing the polyester film, while the same are preferably added before initial condensation is completed. Further, the inactive particles may be added to the polyester film in the form of slurry or powder, while the same are preferably dispersed in the form of slurry, particularly in the form of ethylene glycol (EG) slurry, in order to prevent scattering of the particles and to improve supply accuracy and homogeneity. In the case of the slurry form, dispersion must be uniformly performed in order to reproduce the original primary particles as much as possible. Further, processing such as grinding, classification or filtration of commercially available particulates may be employed to obtain particles of prescribed average size.

The inactive particles are preferably added to the polyester film in the form of differentially scattered slurry coexisting with alkaline metallic salt of phosphoric acid and/or phosphorous acid.

Examples of alkaline metallic salt of phosphoric acid and/or phosphorous acid are sodium salt, potassium salt and the like of orthophosphoric acid, pyrophosphoric acid, polymetaphosphoric acid, polyphosphoric acid, orthophosphorous acid, pyrophosphorous acid, polyphosphorous acid and polymetaphosphorous acid such as sodium primary phosphate, potassium primary phosphate, sodium secondary phosphate, potassium secondary phosphate, sodium tertiary phosphate, potassium tertiary phosphate, sodium pyrophosphate, potassium pyrophosphate, sodium dihydrogenpyrophosphate, sodium hexametaphosphate, potassium hexametaphosphate, sodium tripolyphosphate, potassium tripolyphosphate, sodium phosphite, sodium pyrophosphite, potassium pyrophosphite, sodium metaphosphite and potassium metaphosphite. The said alkaline metallic salt may be employed as a single substance or in combination of two or more substances.

The content of the alkaline metallic salt is preferably 0.04 to 20 wt. % in terms of alkaline metal amount with respect to the inactive particles in the slurry as well as 3 to 50 ppm in terms of alkaline metal amount with respect to the produced polyester. When the content of the alkaline metallic salt is less than the said range, agglomeration of the inactive particles cannot be sufficiently prevented in the steps of producing the polyester film. When the said content is in excess of the aforementioned range, agglomeration of the inactive particles in the steps of producing the polyester film is no more prevented while side reaction by the alkaline metallic salt is increased to exert bad influence such as increase in polymer coloring. The said alkaline metallic salt must be added to the polyester in coexistence with the slurry dispersed with the inactive particles.

The inactive particls can be dispersed in the slurry by any method such as a rotation type high-speed stirring method, a high-pressure homogeneous dispersion method, ultrasonic dispersion method or combination thereof.

A solvent for the slurry of the inactive particles is preferably prepared by a single substance of ethylene glycol (EG), while other solvent such as water or alcohol may be mixed so far as the content of the same is less than 50 wt. %.

The aforementioned alkaline metallic salt of phosphoric or phosphorous acid may be added in any stage during the period from preparation of the slurry.

The said slurry may be added in any arbitrary stage previous to completion of initial condensation.

The initial condensation is completed when intrinsic viscosity approximately reaches 0.2, and thereafter the added components are heterogeneously mixed since viscosity of the system of reaction is too high, whereby a homogeneous product cannot be obtained. Further, olygomer is unfavorably depolymerized to reduce productivity and increase the amount of byproduct of diethylene glycol (DEG).

When aromatic dicarboxylic acid and glycol are directly reacted through the so-called direct polymerization method while employing calcium carbonate as inactive particles, addition of the slurry previous to completion of esterification causes reaction between calcium carbonate and aromatic dicarboxylic acid, whereby insoluble calcium salt is produced in the polyester film. Since such product salt tends to be agglomerated to cause coarse particles, the said slurry is particularly preferably added in a period from completion of esterification to completion of initial condensation.

When calcium carbonate is employed as the inactive particles, it is more preferable to add the calcium carbonate to the polyester polymerization system in the form of slurry dispersed in coexistence with alkaline metallic salt of phosphoric and/or phosphorous acid and to add phosphoric compound containing no metallic salt to the polyester polymerization system.

The phosphoiic compound can be prepared by any substance so far as the same contains no metal and is soluble to the reaction system. Examples of such compound are phosphoric acid, phosphorous acid, phosphonic acid and derivatives thereof, such as phosphoric acid, trimethyl phosphate, triethyl phosphate, tributyl phosphate, triphenyl phosphate, monomethyl phosphate, dimethyl phosphate, monobutyl phosphate, dibutyl phosphate, phosphorous acid, trimethyl phosphite, triethyl phosphite, tributyl phosphite, triphenyl phosphite, methylphosphonic acid, methylphosphonic acid dimethylester, ethylphosphonic acid dimethylester, phenylphosphonic acid dimethylester, phenylphosphonic acid diethylester and phenylphosphonic acid diphenylester. Particularly phosphoric acid, phosphorous acid and ester derivatives thereof are preferable. Such phosphoric compound may be employed as a single substance or in combination of two or more substances. The content of the phosphoric compound must be in a range of 0.01 to 50, preferably of 0.05 to 20 in mole ratio to calcium carbonate. When the said content is less than 0.01, agglomeration of calcium carbonate cannot be sufficiently prevented in the steps of producing the polyester film. When the content is in excess of 50, agglomeration of calcium carbonate is no more prevented in the steps of producing the polyester film, while a problem such as increase in the amount of byproduct of DEG is caused. The phosphoric compound may be added to the polyester film in any stage previous to completion of initial condensation.

The phosphoric compound and the calcium carbonate slurry can be added in any order, while the phosphoric compound is preferably added simultaneously with or previous to the calcium carbonate slurry, in order to more remarkably obtain the effect of the present invention. In case of simultaneous addition, the phosphoric compound may be mixed with the calcium carbonate slurry or added from a supply port separate from that for the calcium carbonate slurry when the phosphoric compound is employed as ester, while the phosphoric compound is preferably not mixed with the calcium carbonate slurry when the phosphoric compound is employed as acid.

In polymeriziion of the polyester film according to the present invention, alkaline metal compound or alkaline earth metal compound may be added in order to improve electrostatic adhesion. When Mg compound or Ca compound is employed to improve electrostatic adhesion of the polyester film, the said phosphoric compound is preferably divided to be added to the polyester film twice or more times.

The method of producing the polyester film according to the present invention is applicable to both of the so-called ester interchange method of making transesterification of dimethylester of aromatic dicarboxylic acid and glycol and the so-called direct polymerization method of directly reacting aromatic dicarboxylic acid with glycol. Further, the present invention can be applied to both of batch type and continuous system production procedures. In case of the ester interchange method, the catalyst for transesterification is not particularly restricted but may be prepared by any catalyst well known in the art. In case of the direct polymerization method, an inhibitor for DEG generation can be arbitrarily prepared by amine or quaternary ammonium salt.

A catalyst for polycondensation is not particularly restricted, but preferably appropriately selected from Sb compound, Ge compound and Ti compound.

Alkaline metal compound, alkaline earth metal compound, Co compound or Zr compound may be arbitrarily employed in order to improve electrostatic adhesion of the polyester film.

EXAMPLE

Description is now made on Examples of the present invention and reference examples In the following description, parts are by weight unless otherwise indicated.

Measurement was carried out in the following manner:

(1) Average Particle Size

Employed was the value at 50% integration in equivalent spherical particle size distribution obtained by a centrifugation type apparatus for measuring particle size distribution (CP-50 by Shimazu Seisakusho).

(2) Surface Flatness of Film

Indicated was centerline average roughness (RA ($\mu$m)) measured through a Surfcom 300A type surface roughness tester by Tokyo Seimitsu under the conditions of 1 $\mu$m in needle diameter, 0.07 g in loaded weight, 0.8 mm in standard length of measurement and 0.08 mm in cut-off.

(3) Endurable Travelling Performance

Endurable travelling performance was evaluated by employing a tester as shown in FIG. 1. Referring to FIG. 1, an end of a polyester film 10 is connected to an end of a crank 1. The polyester film 10 is extended along free rolls 2, 4, 6 and 8 to be in contact with a guide pin 5 of a household VTR. A load 9 is connected to the other end of the polyester film 10. Tension detectors 3 and 7 are provided between the free rolls 2 and 4 and between the free rolls 6 and 8 respectively.

The roughened surface of the polyester film 10 was brought into contact with the guide pin 5 (0.15 $\mu$m in maximum projection height and 0.008 $\mu$m in centerline average roughness measured by a tracer type surface roughness tester) at an angle of $\frac{3}{4}\pi$ (unit: radian) under an atmosphere at 23° C. with relative humidity of 65% to be supplied with tension of 50 g of constant load, and the crank 1 of 40 mm in length was rotated at angular velocity of 8.0 r.p.m. to reciprocate the polyester film 10 by 100 times, to evaluate increments ($\Delta\mu$kd and $\Delta\mu$ks) in coefficients of dynamic friction and static friction from initial values respectively in five grades on the following criteria:

| | |
|---|---|
| grade 1 | not less than 0.15 |
| 2 | 0.10 to 0.15 |
| 3 | 0.05 to 0.10 |
| 4 | 0.02 to 0.05 |
| 5 | less than 0.02 |

(4) Sliding Property of Film

A film slit in small width was run in contact with a metallic drum at a high speed for a long time to evaluate the tape tension after passage through the drum and the amount of white powder produced at the surface of the drum in five grades on the following criteria:

grade 1 large tension (many scratches)
  2 slightly large tension (considerably many scratches)
  3 moderate tension (small scratches)
  4 small tension (substantially no scratch)
  5 extremely small tension (no scratch)

(5) Three-Dimensional Surface Roughness Exponents of Film

Surface roughness of the film was measured by a tracer type three-dimensional surface roughness tester (SE-3AK by Kosaka Kenkyusho) under conditions of 2 $\mu$m in needle radius and 70 mg in load at the cut-off value of 0.25 mm along the longitudinal direction of the film over 1 mm in length of measurement, to fetch data in the vertical direction in quantization width of 0.00312 $\mu$m per 2 $\mu$m in an external memory. Such measurement was made along the lateral direction of the film continuously by 150 times at intervals of 2 $\mu$m, i.e., over film lateral width of 0.3 mm.

SRa: A portion of an area $S_M$ was sampled from a roughness curved surface on its central plane to set the X axis and Y axis of the rectangular coordinate system on the central plane of the sampled portion while expressing an axis orthogonal to the central plane as the Z axis, thereby to express the following value in the unit of $\mu$m:

$$SRa = \frac{1}{S_M} \int_0^{L_X} \int_0^{L_Y} |f(X,Y)| dX dY$$

where $L_X L_Y = S_M$

S$\lambda$a: A surface configuration of a sine function of $y = A\sin w_0 x$ having length $l$ of measurement, spatial angular frequency $w_0$ and amplitude A is assumed to perform the following calculation:

$$\frac{2Ra}{\Delta a} = \frac{\frac{2\pi}{l} \int_0^l |y| dx}{\frac{1}{l} \int_0^l \left|\frac{dy}{dx}\right| dx} =$$

$$\frac{2\pi \int_0^l |\sin w_0 x| dx}{w_0 \int_0^l |\cos w_0 x| dx} = \frac{2\pi}{w_0} = \lambda_0$$

thereby to obtain patial wavelength $\lambda_0$. It is assumed that the centerline of the measured surface roughness is expressed as the X axis by its function $y = f(x)$, to define that the spatial wavelength $\lambda a$ of a sine function satisfying the relationship:

$$\frac{2\pi Ra}{\Delta a} = \frac{\frac{2\pi}{l} \int_0^l |f(x)| dx}{\frac{1}{l} \int_0^l \left|\frac{df(x)}{dx}\right| dx} =$$

$$\frac{2\pi \int_0^l |A\sin wax| dx}{\int_0^l \left|\frac{d(A\sin wax)}{dx}\right|} = \lambda a$$

with respect to f(x) is the spatial average wavelength of the function f(x).

Thus, the spatial average wavelength (SλA) of the three-dimensional surface roughness is defined as follows:

$$S\lambda a = \frac{2\pi \cdot SRa}{S\Delta a}$$

where SRa: three-dimensional central plane average roughness

SΔa: three-dimensional average gradient SΔa: It is assumed that Δr represets change in average circle radius r in the area and the number of particles obtained by cutting respective cutting planes of surface configuration (by average plane standard) to obtain ΔZ/Δr in cutting planes of respective levels and to average the respective values as three-dimensional average gradient.

(6) Number of Coarse Projections on Film Surface

A thin aluminum layer was deposited on the film surface to count the number (per measured area of 1 mm$^2$) of coarse projections larger than the quadruplex ring through a two-beam interference microscope, thereby to express the coarse projection numbers on the following criteria:

| grade 1 | not less than 16/mm$^2$ |
| 2 | 12 to 5/mm$^2$ |
| 3 | 8 to 11/mm$^2$ |
| 4 | 4 to 7/mm$^2$ |
| 5 | 0 to 3/mm$^2$ |

EXAMPLE 1

Employed was a reaction apparatus for continuous esterification comprising a two-stage complete mixing tank provided with a stirrer, a dephlegmeter, a material inlet port and a product outlet port to continuously supply terephthalic acid TPA-ethylene glycol EG slurry adjusted to be 1.7 in mole ratio of (EG) to (TPA) while containing antimony trioxide of 289 ppm in terms of antimony atom in the unit of TPA to a system of a first esterification reactor provided with esterification product.

Simultaneously an EG solution of magnesium acetate tetrahydrate was continuously supplied from a supply port separate from that for the TPA-EG slurry at the rate of 100 ppm in terms of Mg atom in the unit of polyester in the reaction product passing through the reactor, to cause reaction under the normal pressure with a mean residence time of 4.5 hours at a temperature of 255° C.

The reaction product was continuously taken out from the system to be supplied to a second esterification reactor. With respect to the unit of polyester in the reaction product passing through the second esterification reactor, continuously supplied from separate supply ports were 0.5 parts by weight of EG, an EG solution of trimethyl phosphate of 64 ppm in terms of P atom and EG slurry of calcium carbonate of particle size distribution ratio (D$_{50}$/D$_5$) of 0.35 and D$_5$ of 3.4 μm to which 100 g/l of an aqueous solution of sodium tripolyphosphate was added to be 0.80 wt. % in terms of Na atom with respect to calcium carbonate in the slurry, which slurry containing sodium tripolyphosphate was 2500 ppm in terms of calcium carbonate, to cause reaction under the normal pressure with mean residence time of 5.0 hours at a temperature of 260° C.

The esterification product was continuously supplied to a two-stage continuous polycondensation reaction apparatus provided with a stirrer, a dephlegmeter, a material inlet port and a product outlet port to carry out polycondensation, thereby to obtain polyester of 0.620 in intrinsic viscosity. Table 1 shows film characteristics of a film of 15 μm obtained by fusion-extruding the said polymer, drawing the same by 3.5 times at 90° C. in the vertical direction and 3.5 times at 130° C. in the lateral direction and subjecting the same to heat treatment at 220° C.

It is obvious that the film obtained by this Example has an extremely small number of coarse projections, is excellent in slipperiness and endurable travelling performance and is remarkably of high quality.

REFERENCE EXAMPLES 1 AND 2

Films were obtained in the same manner as Example 1 while changing particle size distribution D$_5$ of calcium carbonate to 2.0 μm and 6.5 μm and D$_{50}$/D$_5$ to 0.17 and 0.35. Table 1 also shows the film characteristics thereof.

The films of these reference examples are of low quality, being inferior in slipperiness and endurable travelling performance and having large numbers of coarse projections.

REFERENCE EXAMPLE 3

A film was obtained in the same manner as Example 1 while adding no aqueous solution of sodium tripolyphosphate to the calcium carbonate slurry. Table 1 also shows the film characteristics thereof.

It is obvious that the film of this reference example is excellent in slipperiness and endurable travelling performance, whereas the same has an extremely large number of coarse projections and is of low quality.

REFERENCE EXAMPLE 4

A film was obtained in the same manner as Example 1 while adding no EG solution of trimethyl phosphate to the polymerization system. Table 1 also shows the film characteristics thereof.

It is obvious that the film of this reference example is excellent in slipperiness and endurable travelling performance, whereas the same has an extremely large number of coarse projections and is of low quality.

REFERENCE EXAMPLE 5

A film was obtained in the same manner as Example 1 while changing the content of calcium carbonate to 100 ppm. Table 1 also shows the film characteristics thereof.

It is obvious that the film of this reference example has a small number of coarse projections, whereas the same is inferior in slipperiness and endurable travelling performance, and is of low quality.

REFERENCE EXAMPLE 6

A film was obtained in the same manner as Example 1 while changing the content of calcium carbonate to 10000 ppm. Table 1 also shows the film characteristics thereof.

It is obvious that the film of this reference example is excellent in slipperiness and endurable travelling performance, whereas the same has a large number of coarse projections and is of low quality. Further, the film of this reference example is inferior in surface flatness.

EXAMPLES 2 TO 4

Films were obtained in the same manner as Example 1 while replacing the aqueous solution of sodium tripolyphosphate to be added to calcium carbonate by various solutions of alkaline metallic salt of phosphoric acid. Table 1 also shows the film characteristics thereof.

It is obvious that all of the films of these Examples have extremely small numbers of coarse projections, are excellent in slipperiness and endurable travelling performance and are remarkably of high quality.

EXAMPLE 5

A film was obtained in the same manner as Example 1 while changing the content of calcium carbonate to 1000, ppm and adding 2000 ppm of calcium carbonate having particle size distribution ratio ($D_{50}/D_5$) of 0.28 and $D_5$ of 1.9 μm. Table 1 also shows the film characteristics thereof.

REFERENCE EXAMPLE 7

A film was obtained in the same manner as Example 1 while adding 1500 ppm of calcium carbonate having particle size distribution ratio ($D_{50}/D_5$) of 0.25, $D_5$ of 1.0 μm and volume shape factor of 0.07 and changing the content of Na tripolyphosphate with respect to polyester to 10 ppm. Table 1 also shows the film characteristics thereof.

It is obvious that the film of this reference example has a small number of coarse projections, whereas the same is inferior in slipperiness and endurable travelling performance.

REFERENCE EXAMPLE 8

A film was obtained in the same manner as Example 1 while employing 3500 ppm of kaoline having particle size distribution ratio ($D_{50}/D_5$) of 0.17, $D_5$ of 4.8 μm and volume shape factor of 0.05 in place of calcium carbonate and changing the content of Na tripolyphosphate with respect to polyester to 10 ppm and the content of trimethyl phosphate to 0.02 in mole ratio to kaoline. Table 1 also shows the film characteristics thereof.

It is obvious that the film of this reference example is inferior in slipperiness and endurable travelling performance, has a large number of coarse projections, and is of low quality.

Thus, it is obvious that the films obtained by the Examples of the present invention have extremely small numbers of coarse projections, are excellent in slipperiness and endurable travelling performance and are remarkably of high quality.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| | Calcium Carbonate | | | | | Calcium Carbonate (Example 5), Kaoline (Reference Example 8) | | | | | Alkaline Metalic Salt of Phosphoric Compound | | |
|---|---|---|---|---|---|---|---|---|---|---|---|---|---|
| | Particle Size Distribution $D_{50}/D_5$ | Volume Shape Factor $D_5$ (μm) | Shape Factor f | Content C (ppm) | $D_{50} \times C$ | Particle Size Distribution $D_{50}/D_5$ | Volume Shape $D_5$ (μm) | Shape Factor f | Content C (ppm) | $D_{50} \times C$ | Kind | Content to CaCO$_3$ (wt %) | Content to PEs (ppm) |
| Example 1 | 0.35 | 3.4 | 0.42 | 2,500 | 2975 | — | — | — | — | — | Na Tripolyphosphate | 0.80 | 20 |
| Reference Example 1 | 0.17 | 2.0 | 0.42 | 2,500 | 2100 | — | — | — | — | — | Na Tripolyphosphate | 0.80 | 20 |
| 2 | 0.35 | 6.5 | 0.42 | 2,500 | 2975 | — | — | — | — | — | Na Tripolyphosphate | 0.80 | 20 |
| 3 | 0.35 | 3.4 | 0.42 | 2,500 | 2975 | — | — | — | — | — | None | — | — |
| 4 | 0.35 | 3.4 | 0.42 | 2,500 | 2975 | — | — | — | — | — | Na Tripolyphosphate | 0.80 | 20 |
| 5 | 0.35 | 3.4 | 0.42 | 100 | 119 | — | — | — | — | — | Na Tripolyphosphate | 0.80 | 20 |
| 6 | 0.35 | 3.4 | 0.42 | 10,000 | 11900 | — | — | — | — | — | Na Tripolyphosphate | 0.80 | 20 |
| Example 2 | 0.35 | 3.4 | 0.42 | 2,500 | 2975 | — | — | — | — | — | K Tripolyphosphate | 0.80 | 20 |
| 3 | 0.35 | 3.4 | 0.42 | 2,500 | 2975 | — | — | — | — | — | Na Tertiary Phosphate | 0.80 | 20 |
| 4 | 0.35 | 3.4 | 0.42 | 2,500 | 2975 | — | — | — | — | — | Na Pyrophosphate | 0.80 | 20 |
| 5 | 0.35 | 3.4 | 0.42 | 1,000 | 2975 | 0.28 | 1.9 | 0.40 | 2000 | 1064 | Na Tripolyphosphate | 0.67 | 20 |
| Reference Example 7 | 0.25 | 1.0 | 0.07 | 1,500 | 375 | — | — | — | — | — | Na Tripolyphosphate | 0.67 | 10 |
| 8 | — | — | — | — | — | 0.17 | 4.8 | 0.05 | 3500 | 2870 | Na Tripolyphosphate | 0.28 | 10 |

| | Additives Phosphoric Compound Containing No Metal | | Film Characteristics | | | | | |
|---|---|---|---|---|---|---|---|---|
| | | | Three-Dimensional Surface Roughness Indices | | | Two-Dimensional Surface Flatness | Working Characteristics | | |
| | Kind | Content to CaCo$_3$ (Mole Ratio) | S$\Delta$a | S$\lambda$a (μm) | SRa (μm) | RA (μm) | Slipperiness (Grade) | Endurable Travelling Performance (Grade) | Number of Coarse Projections (Grade) |
| Example 1 | Trimethyl Phosphate | 0.08 | 0.0175 | 9.31 | 0.026 | 0.021 | 5 | 5 | 5 |
| Reference Example 1 | Trimethyl Phosphate | 0.08 | 0.0096 | 12.91 | 0.020 | 0.016 | 3 | 3 | 3 |

TABLE 1-continued

|  |  |  |  |  |  |  |  |  |  |
|---|---|---|---|---|---|---|---|---|---|
| | 2 | Trimethyl Phosphate | 0.08 | 0.0182 | 12.08 | 0.035 | 0.032 | 5 | 5 | 3 |
| | 3 | Trimethyl Phosphate | 0.08 | 0.0151 | 12.07 | 0.029 | 0.023 | 5 | 5 | 1 |
| | 4 | None | — | 0.0161 | 11.71 | 0.030 | 0.023 | 5 | 5 | 1 |
| | 5 | Trimethyl Phosphate | 0.08 | 0.0075 | 9.67 | 0.012 | 0.008 | 2 | 1 | 5 |
| | 6 | Trimethyl Phosphate | 0.08 | 0.0301 | 9.70 | 0.046 | 0.032 | 5 | 5 | 3 |
| Example 2 | | Trimethyl Phosphate | 0.08 | 0.0180 | 9.27 | 0.027 | 0.020 | 5 | 5 | 5 |
| | 3 | Trimethyl Phosphate | 0.08 | 0.0172 | 9.20 | 0.025 | 0.022 | 5 | 5 | 5 |
| | 4 | Trimethyl Phosphate | 0.08 | 0.0180 | 9.32 | 0.027 | 0.022 | 5 | 5 | 5 |
| | 5 | Trimethyl Phosphate | 0.08 | 0.0147 | 9.82 | 0.023 | 0.019 | 5 | 5 | 5 |
| Reference Example 7 | | Trimethyl Phosphate | 0.08 | 0.0033 | 13.50 | 0.007 | 0.010 | 2 | 2 | 5 |
| | 8 | Trimethyl Phosphate | 0.02 | 0.0173 | 13.54 | 0.037 | 0.026 | 2 | 2 | 1 |

What is claimed is:

1. An oriented polyester film having at least one surface being roughened by containing inactive particles and three-dimensional surface roughness exponents of said roughened surface being within ranges simultaneously satisfying the following relationships (I) to (III), the number of coarse projections being less than 7/mm$^2$:

$$0.014 \leq S\Delta a \leq 0.025 \quad (I)$$

$$5.2 \leq S\lambda a \leq 13.0 \quad (II)$$

$$0.012 \leq SRa \leq 0.050 \quad (III)$$

where $S\Delta a$ represents three-dimensional average gradient, $S\lambda a$ represents spatial average wavelength (μm) of three-dimensional surface roughness and $SRa$ represents three-dimensional central plane average roughness (μm).

2. An oriented polyester film in accordance with claim 1, wherein particle size distribution of said inactive particles is within a range simultaneously satisfying the following relationships:

$$0.2 \leq D_{50}/D_5 \leq 0.6 \quad (VII)$$

$$150 \leq D_{50} \times C \leq 10000 \quad (VIII)$$

where $D_{50}$ represents particle size (μm) at 50% integration, $D_5$ represents particle size (μm) at 5% integration and C represents content (ppm) of said particles.

3. An oriented polyester film in accordance with claim 1, wherein said oriented polyester film is a biaxial stretched film.

4. An oriented polyester film in accordance with claim 1, wherein said oriented polyester film is a base film for a magnetic recording tape.

5. An oriented polyester film in accordance with claim 1, wherein said three-dimensional surface roughness exponent SRa is within a range satisfying the following relationship:

$$0.015 \leq SRa \leq 0.035 \quad (IV)$$

6. An oriented polyester film in accordance with claim 5, wherein said three-dimensional surface roughness exponents $S\Delta a$ and $S\lambda a$ are within ranges simultaneously satisfying the following relationships:

$$0.016 \leq S\Delta a \leq 0.025 \quad (V)$$

$$5.2 \leq S\lambda a \leq 10.0 \quad (VI)$$

7. An oriented polyester film in accordance with claim 1, wherein the volume shape factor of said inactive particles satisfies the following relationship:

$$0.08 \leq F (=V/D^3) \leq \pi/6 \quad (IX)$$

where F represents volume shape factor, V represents particle volume (μm$^3$) and D represents the maximum particle size (μm) in the plane of projection.

8. An oriented polyester film in accordance with claim 5, wherein said inactive particles are inactive inorganic particles.

9. An oriented polyester film in accordance with claim 8, wherein one or more kinds of said inactive inorganic particles are of calcium carbonate, which is contained in coexistence with alkaline metallic salt of phosphoric acid and/or phosphorous acid while said oriented polyester film further contains phosphoric compound containing no metallic salt.

10. An oriented polyester film in accordance with claim 8, containing a single or two or more kinds of said inactive inorganic particles in coexistence with alkaline metallic salt of phosphoric acid and/or phosphorous acid.

11. An oriented polyester film in accordance with claim 7, wherein the content of said alkaline metallic salt of phosphoric acid and/or phosphorous acid is 0.04 to 20 wt. % in terms of alkaline metal amount with respect to said inactive inorganic particles and 3 to 50 ppm in terms of alkaline metal amount with respect to produced polyester.

* * * * *